United States Patent
Ciano et al.

(10) Patent No.: US 10,885,200 B2
(45) Date of Patent: Jan. 5, 2021

(54) DETECTING SECURITY RISKS RELATED TO A SOFTWARE COMPONENT

(71) Applicant: International Business Machines Corporation, Armonk, NY (US)

(72) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/192,288

(22) Filed: Nov. 15, 2018

(65) Prior Publication Data

US 2020/0159933 A1    May 21, 2020

(51) Int. Cl.
   G06F 21/57   (2013.01)
(52) U.S. Cl.
   CPC ...... G06F 21/577 (2013.01); *G06F 2221/033* (2013.01)
(58) Field of Classification Search
   None
   See application file for complete search history.

(56) References Cited

U.S. PATENT DOCUMENTS

| | | | |
|---|---|---|---|
| 8,613,080 B2 | 12/2013 | Wysopal et al. | |
| 8,819,832 B2 | 8/2014 | Li et al. | |
| 9,117,081 B2 | 8/2015 | Lukacs et al. | |
| 10,140,453 B1* | 11/2018 | Fridakis | G06F 21/577 |
| 2008/0201705 A1* | 8/2008 | Wookey | G06F 8/658 |
| | | | 717/175 |
| 2011/0231936 A1* | 9/2011 | Williams | G06F 21/577 |
| | | | 726/25 |
| 2012/0096550 A1 | 4/2012 | Sapuntzakis et al. | |
| 2016/0182540 A1 | 6/2016 | Ghosh et al. | |
| 2017/0098072 A1 | 4/2017 | Stopel et al. | |
| 2017/0116412 A1* | 4/2017 | Stopel | G06F 21/577 |
| 2017/0116415 A1 | 4/2017 | Stopel et al. | |
| 2018/0060091 A1 | 3/2018 | Ciano et al. | |
| 2018/0300479 A1 | 10/2018 | Brech et al. | |

OTHER PUBLICATIONS

Qualys, "Container Security, User Guide," https://www.qualys.com/docs/qualys-container-security-user-guide.pdf, Apr. 13, 2018, 27 pgs., © 2018 Qualys, Inc.
Unknown, "Docker Security Scanning," https://docs.docker.com/v17.12/docker-cloud/builds/image-scan/, © 2018, 5 pgs.
International Search Report and Written Opinion for Application PCT/IB2019/058984, dated Jan. 8, 2020, 9 pages.

\* cited by examiner

*Primary Examiner* — Brandon S Hoffman
(74) *Attorney, Agent, or Firm* — Mark Bergner

(57) ABSTRACT

The present disclosure relates to related methods, systems, and media containing instructions for detecting security risks related to a software component deployable in a container-based runtime environment. The method comprises receiving a trigger, the trigger indicating that a layer of a container within the container-based runtime environment is to be checked for security risks. A check layer of the container is identified that is to be checked for security risks. A determination is made that a check for security risks has not been previously performed for the check layer according to a check criterion, and responsive to this determination, a determination is made that a security analysis indicates a security risk. Responsive to this determination, a remedial action may be initiated.

18 Claims, 3 Drawing Sheets

DETECTING SECURITY RISKS RELATED TO A SOFTWARE COMPONENT

BACKGROUND

The present disclosure relates generally to the field of digital computer systems, and more particularly to a method for detecting security risks related to a software component to be deployed in a container-based runtime environment.

Due to technological developments, resources virtualization technology has gained prominence. A user's computer frequently contains, in addition to installed common native applications, products available in virtualization environments. These virtual environments may be viewable in a desktop of the computer and may be grouped into categories such as virtual machines, containers, and virtual appliances. The monitoring of the containers is, however, a challenging task.

SUMMARY

Some embodiments of the present disclosure address the technical problem of improving the efficiency of operating container-based run-time environments. The technical solution disclosed herein provides a system and related method for detecting security risks related to a software component to be deployed in a container-based runtime environment. Advantageous embodiments are described below. Embodiments of the present invention may be freely combined with each other if they are not mutually exclusive.

In one aspect, a computer implemented method for detecting security risks related to a software component to be deployed in a container-based runtime environment is provided. The method may comprise receiving a trigger, the trigger indicating that a layer of a container within the container-based runtime environment is to be checked for security risks. The method may further comprise identifying a check layer of the container that is to be checked for security risks. The method may determine that a check for security risks has not been previously performed for the check layer according to a check criterion, in which case, responsive to the determining that the check for security risks has not been previously performed, determine that a security analysis indicates a security risk. The method may further, responsive to the determining that the security analysis indicates the security risk, initiate a remedial action.

Another aspect involves a computer system for detecting security risks related to a software component to be deployed in a container-based runtime environment. The computer system may comprise a processor of a container vulnerability advisor (CVA) configured to execute instructions that, when executed on the processor, cause the CVA to receive a trigger, the trigger indicating that a layer of the container is to be checked for security risks. The processor may be further configured to execute instructions that identify a check layer of the container that is to be checked for security risks, and determine when a check for security risks has been previously performed for the check layer according to a check criterion. When the determination is negative, then the instructions may cause the processor to perform a security analysis for the check layer. When the security analysis indicates a security risk, then the instructions may cause the processor to initiate a remedial action. When the security analysis indicates no security risk, then the instructions may cause the processor to skip the initiation of the remedial action. When the determination is positive, then the instructions may cause the processor to skip the performance of the security analysis for the check layer.

In another aspect, a computer program product may be provided, comprising a computer-readable storage medium having computer-readable program code embodied therewith, the computer-readable program code configured to perform various method operations described herein.

BRIEF DESCRIPTION OF THE DRAWINGS

The drawings included in the present disclosure are incorporated into, and form part of, the specification. They illustrate example embodiments of the present disclosure and, along with the description, explain various principles of the disclosure. The drawings are only illustrative of typical embodiments and do not limit the disclosure.

Figure 1:
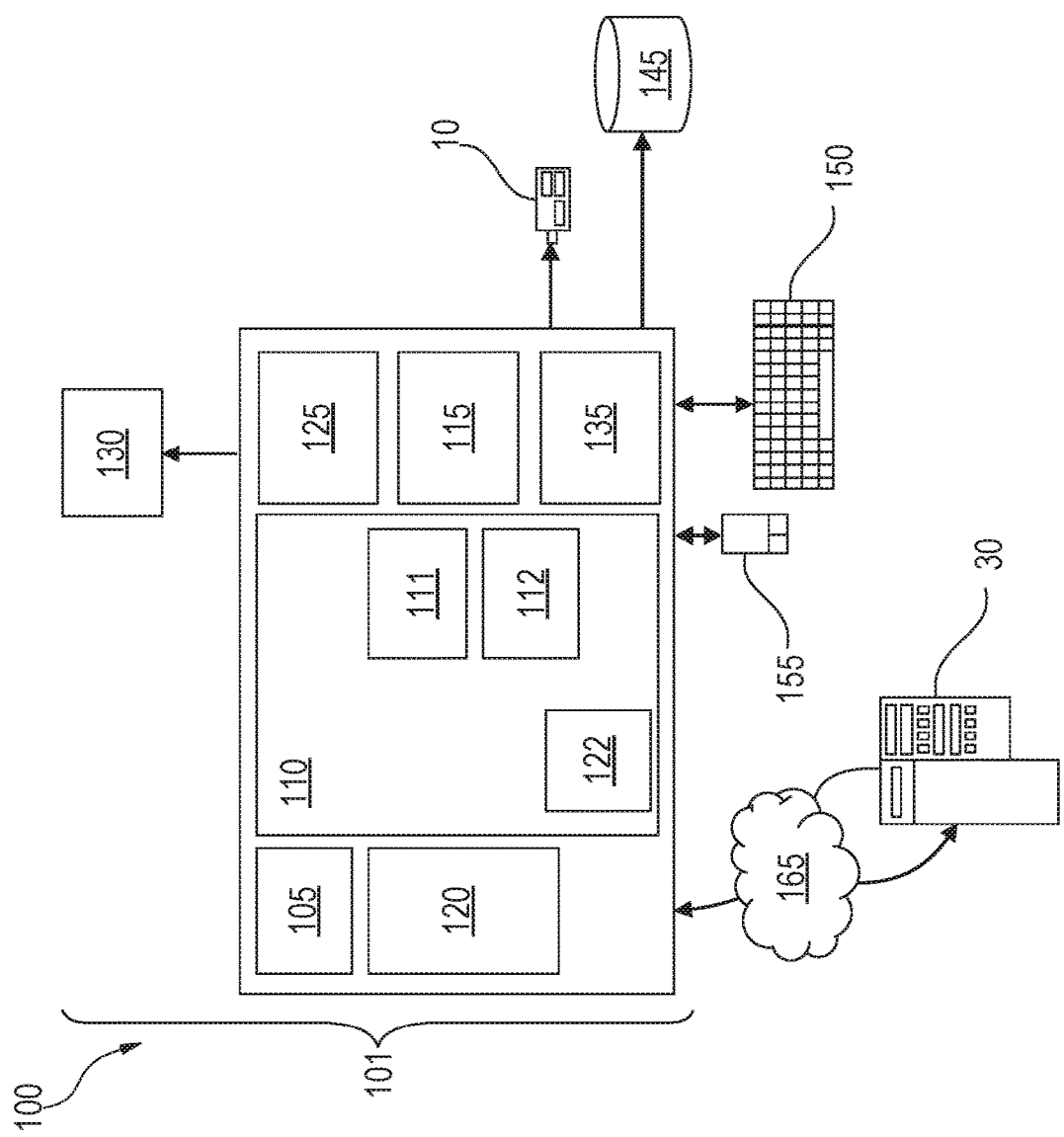
FIG. 1 is a block diagram of an example of a computerized system that may be utilized for one or more method elements, in accordance with some embodiments of the present disclosure.

While the embodiments described herein are amenable to various modifications and alternative forms, specifics thereof have been shown by way of example in the drawings and are described in detail below. The particular embodiments described below are not to be taken in a limiting sense. To the contrary, the intention is to cover all modifications, equivalents, and alternatives falling within the spirit and scope of the invention.

DETAILED DESCRIPTION

Aspects of the present disclosure relate generally to the field of digital computer systems, and more particularly to a method for detecting security risks related to a software component to be deployed in a container-based runtime environment. While the present disclosure is not necessarily limited to such applications, various aspects of the disclosure may be appreciated through a discussion of various examples using this context.

Some embodiments of the method may enable detection of a security exposure at runtime when the container is instantiated without the need to install any agent inside the container. Some embodiments of the method may prevent using the agent inside the container and thus may allow inspection of the containers without compromising their lightweight design, and without running multiple competing processes/agents inside a container. According to the exposure detected, a proper action may be taken to manage the container (and its future executions), thus minimizing security problems.

In contrast to a classic approach in which vulnerability checks are be performed based on a manual invocation, some embodiments of the method may enable vulnerability checks by exploiting a publish/subscribe approach that may be triggered based on external events as a trigger.

Docker® is a container management service provided by Docker, Inc. that permits developers to easily develop applications and ship them into containers that may be readily deployed. A Dockerfile is a text document that contains configuration information and commands for assembling a container image. In a Docker system, Docker images are read-only templates from which Docker containers are launched; each Docker image may contain a series of layers. These layers may be shared between all the containers installed on the same system. The container may be an instance of a container image. For example, the container image may be a Docker image. If these layers have been already analyzed for vulnerabilities, they are not re-checked during a deployment or startup of a new container out of the same image. In other words, security risks that have already been checked for at least one layer of a given container do not need to be checked again for another container that is an instance of the same container image as the given container. This may improve the performance of container-based environments.

Some embodiments of the method may enable detection in time exposures of the applications installed in the containers, and remediation of the security exposures discovered in the containers. This may particularly be advantageous as the containers may be short-lived elements—a classical schedule-driven-scan will likely not be able to detect security risks in such short-lived containers.

The term "container" may refer to a software container that is a virtual software object encompassing all elements needed for an application to run within an operating system. The container may, for example, be an instance of a container image such as a Docker image. The container may comprise the series of layers of the respective container image. Once the container image starts one or more containers may be running. Containers derived from the same image are identical to each other in terms of their application code and runtime dependencies. Examples of containers include, without limitation, Docker containers, which are instances of Docker images that may be run using a Docker run command. The container-based runtime environment may be a computer system that enables the usage, running and the creation of the containers.

According to some embodiments, the trigger may be received from a management entity of the container-based runtime environment in response to the management entity detecting that a new container is to be deployed. This may enable a response in time to potential security risks.

According to some embodiments, the method may comprise detecting a software product present in the layer and determining if a check of security risks has already been performed. This check may be based on querying a virtual environment registry (VER) using information identifying the detected software product. The VER may allow for a centralized source of information that may save resources, particularly if there are many containers that would otherwise be required when splitting the information on each container's database.

According to some embodiments, the security analysis may comprise checking at least one knowledge base that includes information about known security vulnerabilities of a certain software product. This may enable an accurate and consistent processing of multiple images and containers.

According to some embodiments, the container-based runtime environment includes the Docker system, and the trigger is based on a Docker-attach event generated by the Docker system. This embodiment may enable a seamless integration of some embodiments of the present method in existing systems.

While aspects of the present disclosure are discussed with reference to Docker containers, Dockerfiles, Docker images, and other Docker-based commands, it is to be understood that these embodiments are provided for illustrative purposes and without limitation. Other container environments have similar commands and functionality, and embodiments of the present disclosure may be implemented in those other container environments. For example, other container environments may have functionality similar to the Docker-attach event, whereby a terminal's standard input, output, and/or error streams can be attached to a running container, which may serve as a trigger in embodiments. The various methods, systems, and program products disclosed herein can be implemented in conjunction with any suitable container (e.g., containers with similar functionality) and/or container system, and the present disclosure should not be limited to the disclosed embodiments.

Furthermore, it is to be understood that the aforementioned advantages are example advantages and should not be construed as limiting. Embodiments of the present disclosure can contain all, some, or none of the aforementioned advantages while remaining within the spirit and scope of the present disclosure.

FIG. 1 is a block diagram of an example general computerized system 100 that may be used for implementing some embodiments of a method as discussed herein.

The methods described herein may be partly non-interactive, and automated by way of computerized systems, such as servers or embedded systems. In example embodiments, the methods described herein may be implemented in a (partly) interactive system. These methods may further be implemented in software 112, 122 (including firmware 122), hardware (processor) 105, or a combination thereof. In example embodiments, the methods described herein may be implemented in software, as an executable program, and executed by a special or general-purpose digital computer, such as a personal computer, workstation, minicomputer, or mainframe computer. The most general system 100 therefore may include a general-purpose computer 101.

In example embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly software stored in the memory 110. The processor 105 may be any custom made or commercially available processor, a central processing unit (CPU), an auxiliary processor among several processors associated with the computer 101, a semiconductor-based microprocessor (in the form of a microchip or chip set), a macroprocessor, or generally any device or plurality of devices (e.g., in a distributed architecture) for executing software instructions.

The memory 110 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). The memory 110 may have a distributed architecture, where various components are situated remotely from one another, but may be accessed by the processor 105.

The software in memory 110 may include one or more separate programs, each of which comprises an ordered listing of executable instructions for implementing logical functions, notably functions involved in some embodiments. In the example of FIG. 1, software in the memory 110 includes instructions 112 e.g., instructions to manage databases such as a database management system.

The software in memory 110 may also include a suitable operating system (OS) 111. The OS 111 may control execution of other computer programs, e.g., software 112, for implementing various methods, as described herein.

The methods described herein may be in the form of a source program 112, executable program 112 (object code), script, or any other entity comprising a set of instructions 112 to be performed. When utilizing a source program, then the program may be translated via a compiler, assembler, interpreter, or the like, which may or may not be included within the memory 110, to operate properly in connection with the OS 111. Furthermore, the methods may be written as an object-oriented programming language, which has classes of data and methods, or a procedure programming language, which has routines, subroutines, and/or functions.

In various example embodiments, a conventional keyboard 150 and mouse 155 may be coupled to the input/output controller 135. Other output devices, such as the I/O devices 145, may include input devices, e.g., a printer, a scanner, microphone, and the like. Finally, the I/O devices 10, 145 may further include devices that communicate both inputs and outputs, e.g., a network interface card (NIC) or modulator/demodulator (for accessing other files, devices, systems, or a network), a radio frequency (RF) or other transceiver, a telephonic interface, a bridge, a router, and the like.

The I/O devices 10, 145 may be any generalized cryptographic card or smart card known in the art. The system 100 may further include a display controller 125 coupled to a display 130. In various example embodiments, the system 100 may further include a network interface for coupling to a network 165. The network 165 may be an IP-based network for communication between the computer 101 and any external server, client, and the like, via a broadband connection. The network 165 may transmit and receive data between the computer 101 and external systems 30, which may be involved to perform part or all of the method operations discussed herein. In example embodiments, network 165 may be a managed IP network administered by a service provider. The network 165 may be implemented in a wireless fashion, e.g., using wireless protocols and technologies, such as Wi-Fi, WiMAX, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet, or other suitable network system, and may include equipment for receiving and transmitting signals.

If the computer 101 is a PC, workstation, intelligent device, or the like, the software in the memory 110 may further include a basic input output system (BIOS) 122. The BIOS is a set of essential software routines that initialize and test hardware at startup, start the OS 111, and support the transfer of data among the hardware devices. The BIOS may be stored in ROM so that the BIOS may be executed when the computer 101 is activated.

When the computer 101 is in operation, the processor 105 is configured to execute software 112 stored within the memory 110, to communicate data to and from the memory 110, and to generally control operations of the computer 101 pursuant to the software. Instructions for executing the methods described herein and the OS 111, in whole or in part, may be read by the processor 105, possibly buffered within the processor 105, and then executed.

When the systems and methods described herein are implemented in software 112, as is shown in FIG. 1, the software for implementing the methods may be stored on any computer readable medium, such as storage 120, for use by or in connection with any computer related system or method. The storage 120 may comprise a disk storage such as HDD storage.

Figure 2:
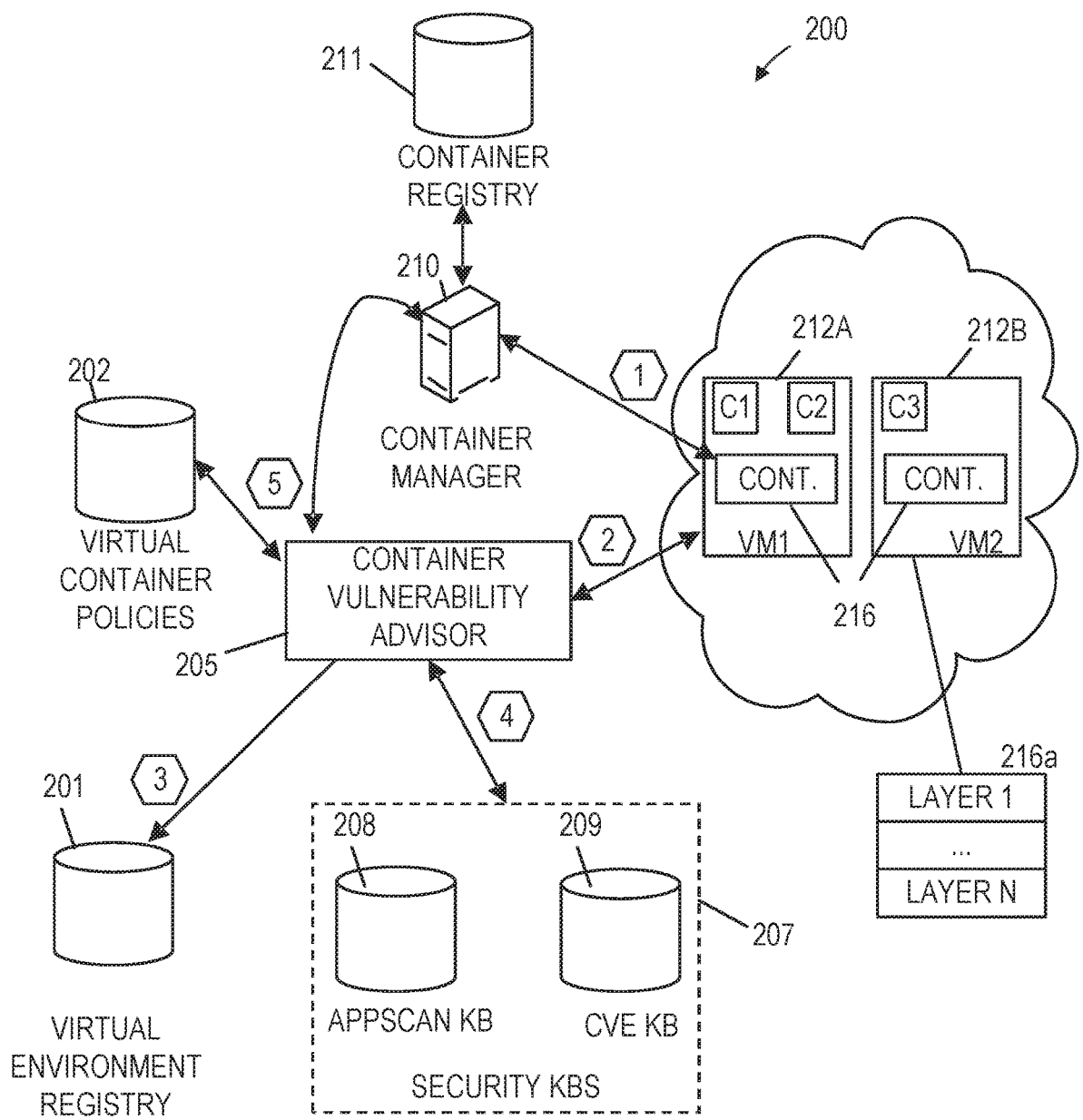
FIG. 2 is a flowchart of an example method that may be utilized for detecting security risks related to a software component deployable in a container-based runtime environment, in accordance with some embodiments of the present disclosure.

FIG. 2 is a block diagram of an example of a container management system 200 that may be utilized for detection and remediation of security vulnerabilities of the applications installed in containers.

The container management system 200 may comprise a virtual environment registry (VER) 201 that contains information about the containers/virtual machines (VMs) 212A, B (collectively or by way of example, 212) and layers available in the VM 212 and containers 216. The VER 201 contains information as to whether a layer of one of the containers has been already processed and scanned for performing a security analysis of the layer. The container management system 200 may further comprise a virtual container policies (VCP) registry 202 containing policies that may be applied for remediating a detected exposure or security risk. The container management system 200 may further comprise a container vulnerabilities advisor (CVA) 205, such as the system 100, that detects vulnerabilities related to the containers and performs the proper action based on the security risk discovered and the available policies. The container management system 200 may further comprise a Security Knowledge Bases (KBs) (SKBs) repository 207 that contains exposure and risk information collected from multiple SKBs such as the IBM Security AppScan® KB 208 and the MITRE Corporation's Common Vulnerabilities and Exposures (CVE®) KB 209 shown in FIG. 2.

The container management system 200 may further comprise a container manager 210 which may serve as a management entity of the containers. The container manager 210 is shown in FIG. 2 as a separate component from the CVA 205—however, in another example embodiment, the container manager 210 may be part of the CVA 205, and thus, certain operations and structural aspects described herein as relating to the CVA 205 may also be construed as relating to the container manager 210 as well. The container manager 210 may be configured to communicate with the CVA 205 via a connection such as a cable connection or network connection when the container managers 210 and the CVA 205 are physically separated entities, and via a system bus or via messages or other internal communication schemes when they are physically combined entities. The container manager 210 may be configured to monitor and/or control the operation of container-based runtime environments (VMs) 212. The container-based runtime environment 212 may comprise a virtualized system to enable operation of a virtualized computing resource, e.g., by utilizing a partition of hardware resources (e.g., C1, C2, and C3) via apportioned and/or discrete containers 216 and/or VMs.

A container registry 211 of the container management system 200 may, for example, comprise information about the container-based runtime environments 212. As shown in FIG. 2, the container-based environments 212 may comprise containers 216.

The container management system 200 may be configured to detect a security exposure for running a particular container 216 (or a security risk of the container 216 itself) and apply an appropriate remediation as described below.

In operation 1 (as indicated with the hexagon), the startup of a given container 216 or any other configurable event may be detected by, e.g., the CVA 205. Such a detection may comprise receiving, by the CVA 205, a trigger from the container manager 210. This detection may invoke a scanning of the given container 216, e.g., by the CVA 205. The detection may, for example, be implemented with an event listener registered to a Docker-Engine that is able to reactively "docker-attach" into a started container 216.

In operation 2, product information related to the given container may be retrieved by the CVA 205, possibly via the container manager 210. One or more layers 216a of the container 216 may be scanned by the CVA 205 to collect or verify the product information about products being utilized within the layer. The product information may, for example, provide information about products such as version numbers, release or executable file dates, and the like, present and/or running in layers 216a of the container 216. For the one or more container layers 216a of the given container 216, further information about the particular container layer 216a may also be retrieved from the VER 201 for subsequent processing.

The container layers 216a may, for example, be processed layer-by-layer as follows. If a current container layer 216a of the given container 216 has been scanned (e.g., for determining security risks of the layer) before a configurable timeframe or according to a predefined criteria, that layer 216a may be skipped and a next container layer 216a may be processed. If a container layer 216a has not been scanned previously, other information, such as product identifiers, may be extracted from the container layer 216a and may be saved in the VER 201. In an example situation in which Docker containers are utilized, this may be realized by retrieving a current list of ISO 19770-2 SW identification tags, or swidtags (e.g., using a command "cp -R *.swidtag") and saving them into a private storage (e.g. "/common/<container-id>/...").

For each product identified (e.g., parsed from an XML field of the swidtag) it may be determined in operation 3, based on an identifier, such as an sw-component-id, of the product, if a security risk or a CVE has been reported for that product identifier stored in the VER 201.

For each product identified, it may be determined in operation 4, based on the identifier, such as the sw-component-id, if a CVE has been reported for the product identified into the SKBs 207.

If an exposure is detected (e.g., a CVE is reported) a proper remediation action to be performed that is related to the exposure may be retrieved in operation 5 from the VCP 202, e.g., the policies associated with the detected security risk may be read from the VCP 202. These policies or actions may be performed in order to resolve the detected security risk. For example, as a remediation action, the system, e.g., the CVA 205, may stop and/or quarantine the running container 216 (the given container), prevent new containers 216 from being spawned from the same originating initiating element (e.g., a Dockerfile) of the given container 216, trigger an action to rebuild and/or patch the originating initiating element (e.g., Dockerfile), and restart the containers 216 originated from the initiating element, etc. If a container layer 216a is scanned with success, then an update of the related information for that layer 216a in the VER 201 may be performed. A Dockerfile may be used to build container images, which then become the basis of running containers 216. Although a Dockerfile is an example of an initiating element, other forms of an originating element having similar capabilities (i.e., assembling container images) may be utilized as well (e.g., binary or non-text).

Figure 3:
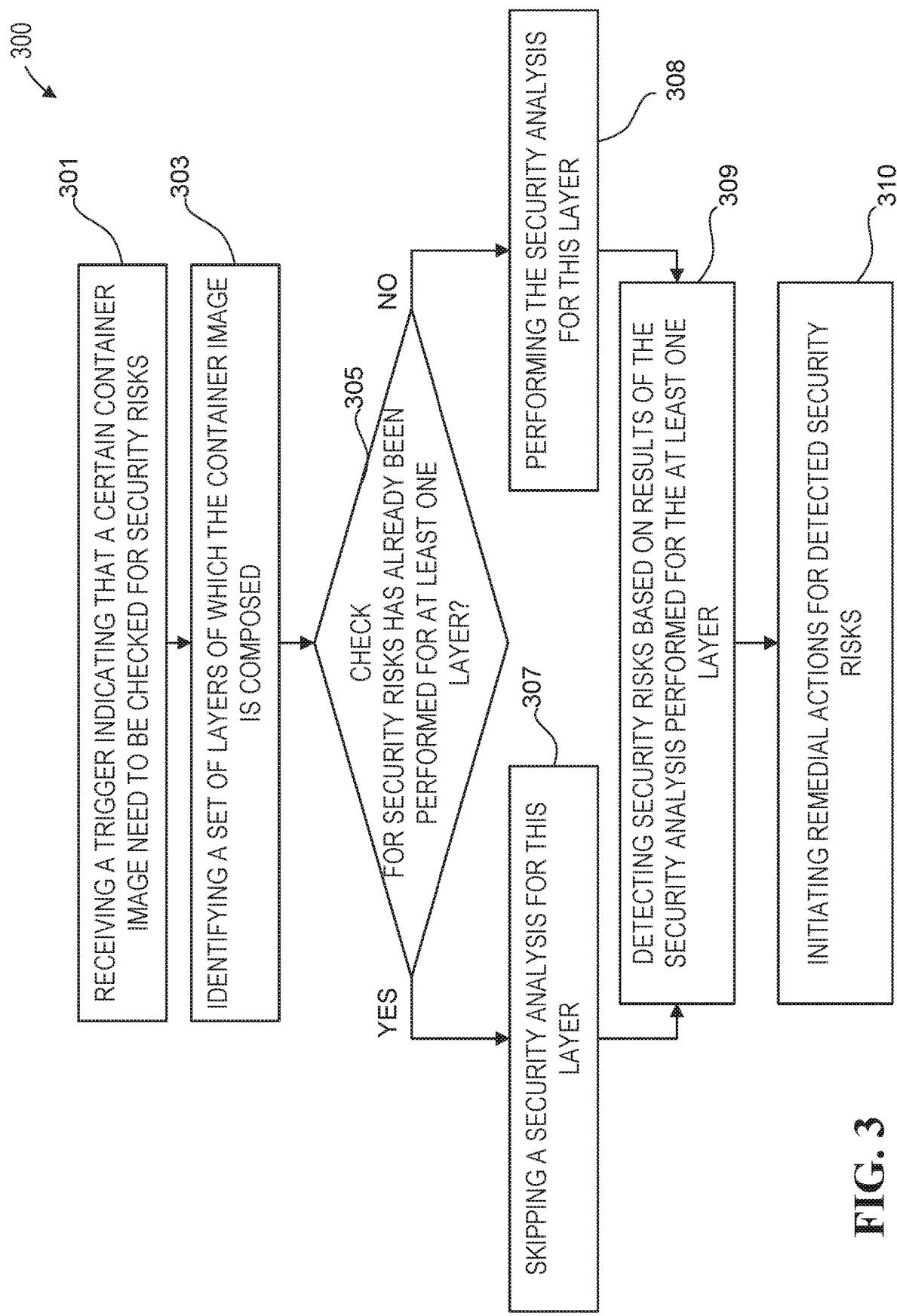
FIG. 3 is a block diagram of an example of a container management system that may be utilized for detection and remediation of security vulnerabilities of the applications installed in containers, in accordance with some embodiments of the present disclosure.

FIG. 3 is a flowchart of an example process 300 for detecting security risks related to a software component in a container-based runtime environment.

In operation 301, a trigger may be received by, e.g., the container manager 210 (which may include the CVA 205), as described above. The trigger may indicate that a certain container 216 or layer 216a within the container needs to be checked for security risks. The container 216 may, for example, be an instance of a container image such as Docker image, as described above. Once the container image starts, one or more containers 216 may be running. Containers 216 derived from a same image may be identical to each other in terms of their application code and runtime dependencies.

In operation 303, a set of layers 216a of the container 216 may be identified. This may, for example, be performed by, e.g., the container manager 210 querying a database, e.g., the VER 201, that contains information on containers 216 of the container-based runtime environment 212.

In operation 305, if a check for security risks by, e.g., the container manager 210, has already been performed for at least one layer 216a of the identified set of layers (305: YES), a security analysis of this layer may be skipped in operation 307. This determination as to "already been performed" may include one or more check criteria. For example, the check criteria may utilize time information, such as a time range (e.g., was the check performed within the last month, or was the check performed at any time within the past) or event information (e.g., was the check performed based on an express user or administrator request). Otherwise (305: NO) the security analysis may be performed by, e.g., the container manager 210, in operation 308. The inquiry operation 305 may, for example, be performed based on a predefined time period (e.g., the last week starting from the time at which operation 305 is executed) or according to some other predefined scanning criteria, by querying a database, e.g., the VER 301, that comprises information related to each layer 216a and other products of the containers 216. This information may include whether the layer 216a has been scanned or not during the predefined time period or other scanning criteria. Skipping previously processed layers 216a may save processing resources that would otherwise be required for processing these layers 216a.

In operation 309, security risks may be detected based on results of the security analysis performed for the at least one layer 216a. The security analysis may, for example, comprise, for each product identified of the layer being checked: determining, based on the product ID of the identified product, if a security risk or a container vulnerability event has been reported for that product ID into a given database, such as the security KBs 207.

In operation 310, remedial actions to address the detected security risks may be initiated by, e.g., the CVA 205 or the container manager 210. The initiation of the remedial actions may comprise at least one of providing an indication that a security risk or container vulnerability event has been detected, initiating a routine that locates the risk or vulnerability in the VCP 202, or initiates an application of a policy associated with the risk or vulnerability. In another example, operations 301-310 may be performed on a container image instead of the container. The remedial actions to take may be contained in the VCP 202, as described above. Although the remedial actions may be initiated by the CVA 205 or the container manager 210, various elements of the remedial actions may be executed by and/or applied to other elements either within the container-based run-time environments 212 or external to them (e.g., elements used to create the virtual machines, containers, or layers contained within).

The present method may be applied for container images as well. In one example, a method for detecting security risks related to a software component to be deployed in a container-based runtime environment is provided. The method may comprise: receiving a trigger, the trigger indicating that a certain container image needs to be checked for security risks; identifying a set of layers of which the container image is composed; determining if a check for security risks has already been performed for at least one layer of the identified set of layers and, if so, skipping a security analysis of this layer and otherwise performing the security analysis; and detecting security risks based on results of the security analysis performed for the at least one layer.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer implemented method for detecting security risks related to a software component to be deployed in a container-based runtime environment, the method comprising, utilizing a processor of a container vulnerability advisor (CVA):
   receiving a trigger, the trigger indicating that a layer of a container within the container-based runtime environment is to be checked for security risks;
   identifying a check layer of the container that is to be checked for security risks;
   determining that a check for security risks has not been previously performed for the check layer according to a check criterion;
   responsive to the determining that the check for security risks has not been previously performed, determining that a security analysis indicates a security risk; and
   responsive to the determining that the security analysis indicates the security risk, initiating a remedial action.

2. The method of claim 1, wherein the trigger is received from a container manager for the container-based runtime environment in response to the container manager detecting that a new container is to be deployed.

3. The method of claim 1, further comprising detecting a software product present in the layer, wherein the determining of when the check of security risks has already been performed comprises querying a registry (VER) using product information related to the detected software product.

4. The method of claim 3, wherein the product information comprises at least one of version numbers, a release date, or executable file date.

5. The method of claim 3, further comprising updating the VER to indicate that the security analysis was performed for the layer.

6. The method of claim 1, wherein the security analysis comprises checking a security knowledge base, the security knowledge base comprising information about known security vulnerabilities of software products in the layer.

7. The method of claim 1, wherein the receipt of the trigger automatically initiates the identifying, the determining that the check for security risks has not been previously performed, and the determining that a security analysis indicates a security risk.

8. The method of claim 1, further comprising providing at least one of a warning indicative of the detected security risk or providing an indication of the remedial action of the detected security risk.

9. The method of claim 1, further comprising repeating the identifying, the determining that the check for security risks has not been previously performed, and the determining that a security analysis indicates a security risk for all layers of container.

10. The method of claim 1, wherein the check criterion utilizes time information or event information.

11. The method of claim 1, wherein the remedial action is at least one of stopping the container when it is running, quarantining the container, preventing a new container from being spawned from a same originating initiating element of the container, performing or triggering a rebuild or a patch to the same originating initiating element, or restarting the containers from the same originating initiating element.

12. The method of claim 1, wherein the initiating of the remedial action is at least one of providing an indication that a security risk or container vulnerability event has been detected, initiating a routine that locates the risk or vulnerability in a virtual container policies store, or initiates an application of a policy associated with the risk or vulnerability.

13. The method of claim 1, further comprising:
determining that the check for security risks has been previously performed for the check layer according to the check criterion; and
responsive to determining that a check for security risks has been previously performed, skipping the performing of the security analysis for the check layer.

14. The method of claim 1, further comprising:
determining that the security analysis does not indicate the security risk;
responsive to the determining that the security analysis does not indicate the security risk, skipping the initiating of the remedial action.

15. The method of claim 1, wherein the CVA is external to the container.

16. A computer system for detecting security risks related to a software component to be deployed in a container-based runtime environment, the computer system comprising a processor of a container vulnerability advisor (CVA) configured to execute instructions that, when executed on the processor, cause the CVA to:
receive a trigger, the trigger indicating that a layer of the container is to be checked for security risks;
identify a check layer of the container that is to be checked for security risks;
determine when a check for security risks has been previously performed for the check layer according to a check criterion;
when the determination is negative, then:
perform a security analysis for the check layer;
when the security analysis indicates a security risk, then initiate a remedial action; and
when the security analysis indicates no security risk, then skip the initiation of the remedial action; and
when the determination is positive, then skip the performance of the security analysis for the check layer.

17. The system of claim 16, wherein the instructions further cause the CVA to:
detect a software product present in the layer, wherein the determination of when the check of security risks has already been performed comprises querying a registry (VER) using product information related to the detected software product.

18. A computer program product comprising a non-transitory computer-readable storage medium having computer-readable program code embodied therewith, the computer-readable program code configured to, when run on a processor of a container vulnerability advisor (CVA), to:
receive a trigger, the trigger indicating that a layer of the container is to be checked for security risks;
identify a check layer of the container that is to be checked for security risks;
determine when a check for security risks has been previously performed for the check layer according to a check criterion;
when the determination is negative, then:
perform a security analysis for the check layer;
when the security analysis indicates a security risk, then initiate a remedial action; and
when the security analysis indicates no security risk, then skip the initiation of the remedial action; and
when the determination is positive, then skip the performance of the security analysis for the check layer.

* * * * *